(12) United States Patent
Hiraoka

(10) Patent No.: US 8,339,420 B2
(45) Date of Patent: Dec. 25, 2012

(54) METHOD AND APPARATUS FOR PRODUCING SIZE-APPROPRIATE IMAGES TO BE DISPLAYED BY AN ELECTRONIC DEVICE WITH A SMALL DISPLAY AREA

(75) Inventor: Kenji Hiraoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 675 days.

(21) Appl. No.: 11/993,637

(22) PCT Filed: Jun. 28, 2006

(86) PCT No.: PCT/JP2006/312913
§ 371 (c)(1),
(2), (4) Date: Dec. 21, 2007

(87) PCT Pub. No.: WO2007/004489
PCT Pub. Date: Jan. 11, 2007

(65) Prior Publication Data
US 2010/0079496 A1  Apr. 1, 2010

(30) Foreign Application Priority Data
Jun. 30, 2005 (JP) .................................. 2005-192076

(51) Int. Cl.
*G09G 5/00* (2006.01)
*G06F 3/048* (2006.01)
(52) U.S. Cl. ......... 345/660; 345/688; 715/766; 715/798
(58) Field of Classification Search .................. 345/660; 715/243, 730, 798, 766
See application file for complete search history.

(56) References Cited

U.S. PATENT DOCUMENTS

| | | | |
|---|---|---|---|
| 6,184,884 B1 | 2/2001 | Nagahara et al. | |
| 6,587,119 B1 * | 7/2003 | Anderson et al. | 345/672 |
| 6,654,506 B1 * | 11/2003 | Luo et al. | 382/282 |
| 6,868,192 B2 * | 3/2005 | Takiguchi | 382/299 |
| 2004/0150657 A1 * | 8/2004 | Wittenburg et al. | 345/619 |

(Continued)

FOREIGN PATENT DOCUMENTS

EP  1 052 849 A1  11/2000

(Continued)

OTHER PUBLICATIONS

International Search Report; search agent—Japanese Patent Office; date completed Jul. 19, 2006.

*Primary Examiner* — Michelle L Sams
(74) *Attorney, Agent, or Firm* — Pearne & Gordon LLP

(57) ABSTRACT

The contents of a small image displayed on the back side can be made easy to understand. A layout managing portion outputs display area information indicating display areas of respective small images displayed on the small image list, and arrangement information of respective small images displayed on the small image list. An image zooming portion produces a zoom image by zooming in or out an image of a main area of an original image extracted by a main area extracting portion in response to an area of the display area being output from the layout managing portion produces the small images displayed on the small image list by expanding or contracting the produced zoom image. An image layout designing portion produces the small image list by arranging respective generated small images at predetermined locations of the small image list, based on arrangement information output from the layout managing portion.

5 Claims, 5 Drawing Sheets

U.S. PATENT DOCUMENTS

| | | | |
|---|---|---|---|
| 2004/0205504 A1* | 10/2004 | Phillips | 715/501.1 |
| 2005/0068339 A1* | 3/2005 | Lipsky et al. | 345/661 |
| 2005/0160377 A1 | 7/2005 | Sciammarella et al. | |
| 2005/0212817 A1* | 9/2005 | Cannon et al. | 345/619 |
| 2006/0277491 A1* | 12/2006 | Kaneko | 715/788 |

FOREIGN PATENT DOCUMENTS

| | | |
|---|---|---|
| JP | 62-144273 | 6/1987 |
| JP | 6-222899 | 8/1994 |
| JP | 9-97154 | 4/1997 |
| JP | 11-250223 A | 9/1999 |
| JP | 2000-57326 | 2/2000 |
| JP | 2001-136358 A | 5/2001 |
| JP | 2001-306375 | 11/2001 |
| JP | 2001-312268 | 11/2001 |
| JP | 2003-173304 | 6/2003 |
| JP | 2005-080070 A | 3/2005 |
| WO | 00-33571 | 6/2000 |

\* cited by examiner

METHOD AND APPARATUS FOR PRODUCING SIZE-APPROPRIATE IMAGES TO BE DISPLAYED BY AN ELECTRONIC DEVICE WITH A SMALL DISPLAY AREA

TECHNICAL FIELD

The present invention relates to an image processing apparatus and an image processing method for producing small images that are displayed as a list on a device such as a mobile terminal, or the like, whose display area is small.

BACKGROUND ART

In the prior art, as a method of managing a large number of images, there are a method of using a window and a folder and a method of selecting a format to display images. According to the method of using the window, first a window having a plurality of program groups is displayed, then a second window appears when the user selects one of program groups, and then a small image showing the image belonging to the selected program group is displayed. Also, this method processes the images hierarchically by using the fixed pseudo light box to display all images of the same size like a slide show. In contrast, according to the method of selecting the format to display images, the item corresponding to the selected format is extracted from the database when the user selects a display format from a list, and then such item is displayed on the list that depends on the selected format.

However, such a problem existed that these methods are insufficient to give a display such that the user can grasp simply and quickly the image.

As the method of overcoming the above problem, as shown in FIG. 7(a), the image processing method of displaying a plurality of small images 300, which are used to select an image having a chance to be grasped as the object, sequentially at predetermined locations on a display portion to increase a display area gradually toward a center while moving dynamically the displayed small images 300 in an arrow direction, and then eliminating finally these images from predetermined locations on the display portion is disclosed. Also, as shown in FIG. 7(b), the image processing method of displaying a plurality of small images 300 sequentially at predetermined locations on a display portion while moving dynamically the displayed small images 300 in loops and decreasing a display area in every movement, and then eliminating finally the small images from a center of the loop is disclosed (see Patent Literature 1, for example). According to these methods, the small images displayed large are arranged apparently on the front side and the small images displayed small are arranged apparently on the back side. As a result, a pseudo three-dimensional display can be attained.
Patent Literature 1: JP-A-2001-306375

DISCLOSURE OF THE INVENTION

Problems that the Invention is to Solve

However, there existed such a problem that, when the small image whose display area is particularly small is displayed, it is difficult for the user to understand the contents. For example, in the above pseudo three-dimensional display, there existed such circumstances that a size of the image becomes smaller as the small image is displayed apparently on the back side and it is more difficult for the user to understand the contents.

The present invention has been made in view of the above circumstances, and it is an object of the present invention to provide an image processing apparatus and an image processing method capable of making the contents of images that are displayed small easy to understand.

Means for Solving the Problems

The present invention provides an image processing apparatus for displaying a small image list having a plurality of small images, which includes an original image outputting portion for outputting an original image to produce the small images; a main area extracting portion for extracting an image of a main area from the original image output from the original image outputting portion; a layout managing portion for outputting display area information indicating display areas of respective small images displayed on the small image list, and arrangement information of respective small images displayed on the small image list; a zoom image producing portion for producing a zoom image by zooming in or out the image of the main area extracted by the main area extracting portion in response to an area of the display area indicated by the display area information being output from the layout managing portion; a small image producing portion for producing the small images displayed on the small image list by expanding or contracting the zoom image produced by the zoom image producing portion; and a small image list producing portion for producing the small image list by arranging respective small images produced by the small image producing portion at predetermined locations of the small image list, based on the arrangement information being output from the layout managing portion.

According to this configuration, the zoom rate of the zoom image is set appropriately in response to the display area of the small image. Therefore, an occupying rate of the main area can be changed in response to respective display areas in respective small images, and then the contents of the small images can be made easy to understand.

Also, the zoom image producing portion decides a zoom rate based on a value obtained by dividing an area of a display area indicated in the display area information by an area of the original image output from the original image outputting portion.

Also, the zoom image producing portion zooms in or out the original image such that the image of the main area extracted by the main area extracting portion is positioned at a center and the image of the main area is contained in the zoom image.

Also, the zoom image producing portion zooms in or out the original image such that the zoom image produced at a largest zoom rate becomes equal to the image of the main area extracted by the main area extracting portion.

An image displaying device is constructed by using in combination the above image processing apparatus; and a display portion for displaying the small image list produced by the small image list producing portion. Such image displaying device should be preferably employed particularly in a mobile terminal such as a cellular phone, or the like.

Also, the present invention provides an image processing method of displaying a small image list having a plurality of small images, which includes outputting an original image to produce the small images; extracting an image of a main area from the output original image; producing a zoom image by zooming in or out the image of the extracted main area in response to an area of the display area indicated in display area information indicating display areas of respective small images displayed on the small image list; producing the small images displayed on the small image list by expanding or contracting the produced zoom image; and producing the small image list by arranging respective produced small images at predetermined locations of the small image list, based on arrangement information of respective small images displayed on the small image list.

Also, the present invention provides a program of causing a computer to execute a procedure for outputting an original image to produce the small images; a procedure for extracting an image of a main area from the output original image; a procedure for producing a zoom image by zooming in or out the image of the extracted main area in response to an area of the display area indicated in display area information indicating display areas of respective small images displayed on the small image list; a procedure for producing the small images displayed on the small image list by expanding or contracting the produced zoom image; and a procedure for producing the small image list by arranging respective produced small images at predetermined locations of the small image list, based on arrangement information of respective small images displayed on the small image list. Such program is recorded in a memory, a storing device, or the like provided to the inside or the outside of the image processing apparatus, and is executed by a computer like CPU, a computing device, or the like.

Advantages of the Invention

The present invention is able to make the contents of small images displayed easy to understand since the contents of display can be changed in answer to a size of the small image. In particular, the present invention is useful to the case where plural small images of various sizes are displayed, like a pseudo three-dimensional display.

Figure 1:
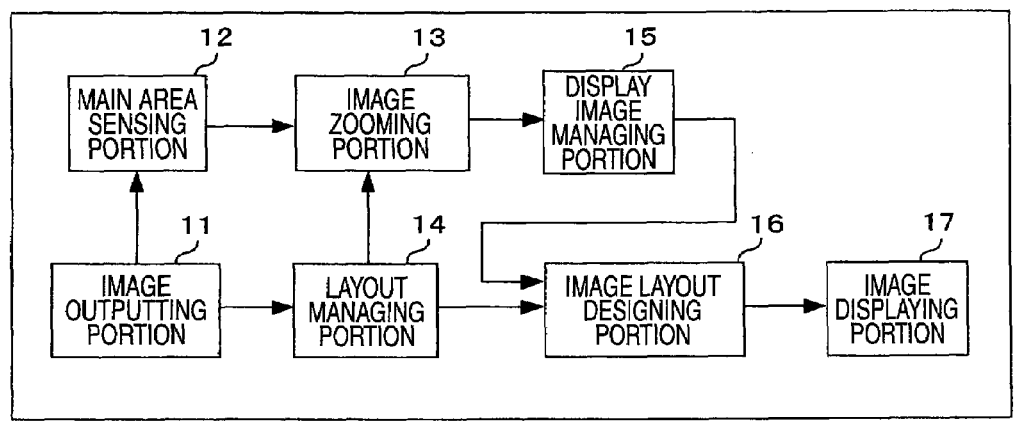
FIG. 1 A block diagram showing a configuration of an image processing apparatus according to an embodiment of the present invention.

DESCRIPTION OF REFERENCE NUMERALS 11 image outputting portion
12 main area sensing portion
13 image zooming portion
14 layout managing portion
15 display image managing portion
16 image layout designing portion
17 image displaying portion

BEST MODE FOR CARRYING OUT THE INVENTION

An image processing apparatus according to a best mode for carrying out the invention will be explained with reference to the drawings hereinafter.

FIG. 1 is a block diagram showing a configuration of an image processing apparatus according to an embodiment of the present invention. The image processing apparatus of this embodiment is a system that produces a list of small images having a plurality of small images (referred to as a "small image list" hereinafter) from picked-up images, and is constructed to include an image outputting portion 11, a main area sensing portion 12, an image zooming portion 13, a layout managing portion 14, a display image managing portion 15, and an image layout designing portion 16, as shown in FIG. 1.

The "small image" means an image on which a part or all of an original image is displayed in a partial area of an image displaying portion 17 described later. Normally, when a part of the original image is to be displayed, at least a main area of the original image is contained in a part of that image as described later. Also, the "small image" or the "small image list" is called commonly a "thumbnail image".

The image outputting portion (original image outputting portion) 11 outputs the image, which is picked up by the imaging device (not shown) such as the CCD camera, or the like or stored previously, to the main area sensing portion 12 as an original image 100 that is needed in producing the small image.

The main area sensing portion (main area extracting portion) 12 is constructed by a memory such as RAM, or the like. This main area sensing portion 12 extracts an image in a main area 101 (referred to as a "main area image" hereinafter) from the original image 100 shown in FIG. 2, by using parameters applied in recognizing a particular shape. Here, the main area 101 denotes an area used in producing the small area described later and corresponds to the number of small images depicted in the small image list. As the parameters, there are 1) templates compared with a particular shape, e.g., a human face in the original image, 2) a hue distribution in the original image 100, i.e., RGB values of respective pixels to specify a edge (profile) of a particular shape in the original image 100, 3) a luminance distribution in the original image 100, i.e., YUV values of respective pixels instead of the RGB values in the hue distribution, 4) a sound attached to the original image 100, 5) inputting conditions for the original image 100, and the like.

The image zooming portion 13 produces the small images from the main area image being output from the main area sensing portion 12, based on information indicating the display area of respective small images displayed on the small image list being output from the layout managing portion 14. First, the image zooming portion 13 decides a zoom rate for the main area image being output from the main area sensing portion 12, and produces a zoom image.

The zoom image denotes an image that is cut out from the original image 100 to contain at least the overall main area (main area image). Also, the zoom rate is represented by a ratio of a size of the resultant zoom image to a size of the original image 100. In other words, areas except the main area become smaller in the zoom image whose zoom rate is larger, while areas except the main area become larger in the zoom image whose zoom rate is smaller. Also, in other words, the zoom image whose area rate of the main area is larger is obtained by setting the zoom rate large whereas the zoom image whose area rate of the main area is smaller by setting the zoom rate small.

Figure 7A:
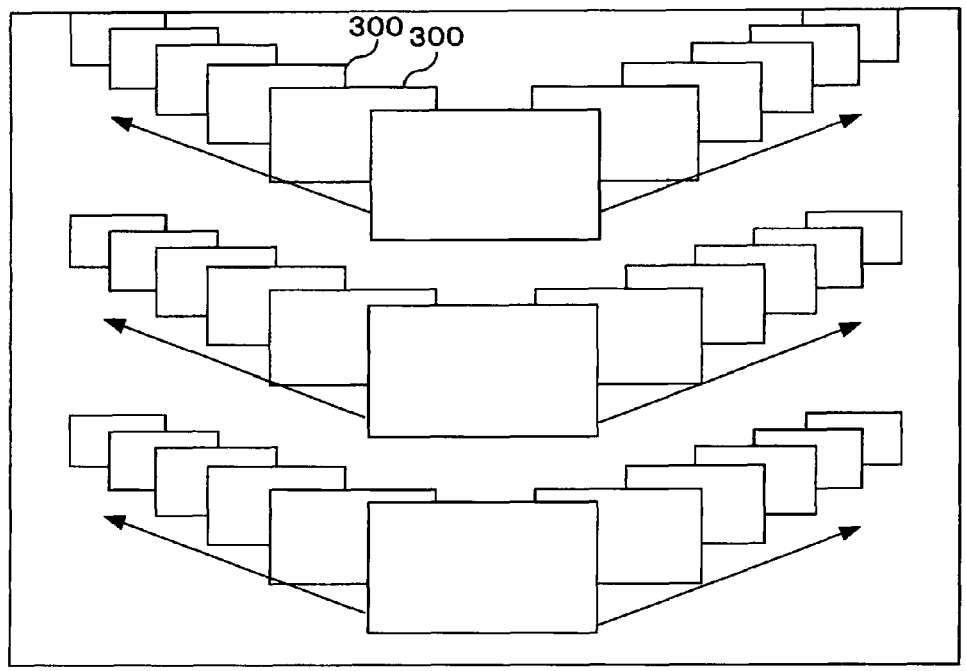
FIG. 7 A view showing a small image list that the image processing apparatus in the prior art displays.
Figure 7B:
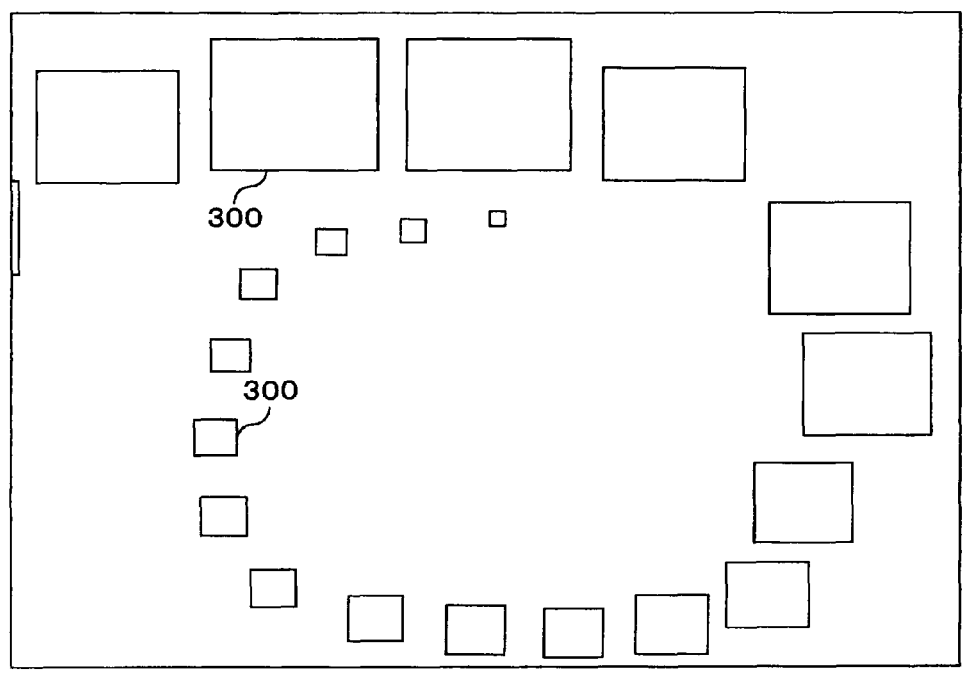

Therefore, it is preferable that, when the actually displayed small image is relatively large, the zoom images whose zoom rate is small should be used as the small images arranged apparently on the front side, in the example in FIG. 7. The reason for this is given such that, since the actually displayed small image is relatively large, the user can grasp easily the contents even when an area rate of the main area is small.

In contrast, it is preferable that, when the actually displayed small image is small, the zoom images whose zoom rate is large should be used as the small images arranged apparently on the back, in the example in FIG. 7. The reason for this is given such that, since the actually displayed small image is small, the user can grasp easily the contents if an area rate of the main area is large.

Figure 3:
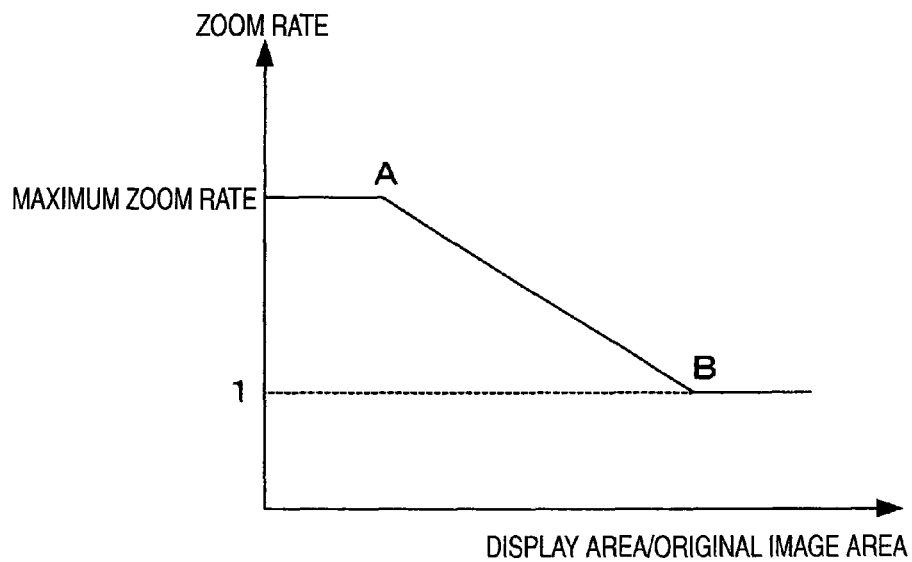
FIG. 3 A view explaining a zoom rate.

In the present embodiment, in accordance with the above facts, a zoom rate decided along a zoom rate deciding line shown in a graph of FIG. 3 is set to a value obtained by dividing the display area (area of the actually displayed small image) by an area of the original image 100 (display area/original image area), and the zoom image is produced along with the zoom rate. The zoom rate is reduced on the right side of the graph, i.e., as the display area becomes larger. As a result, preferably a setting on the right side of the graph should be used as the small images arranged apparently on the front side in the example in FIG. 7 whereas preferably a setting on the left side of the graph should be used as the small images arranged apparently on the back side in the example in FIG. 7.

The display area given by the information indicating the display area becomes equal to the area of the original image 100 at a location indicated by a reference symbol B in FIG. 3, which denotes that a zoom rate is 1 at which no zoom is applied at all. Also, a location indicated by a reference symbol A in FIG. 3 denotes a maximum zoom rate at which the main area image is zoomed largest. In addition, the zoom rate is increased from 1 to the maximum zoom rate from the reference symbol B to the reference symbol A. In this example, the zoom rate is changed linearly from the reference symbol B to the reference symbol A, but a changing mode is not particularly limited. Also, in this example, the zoom rate is set to 1 at the location indicated by the reference symbol B, but other zooms except 1 rate may be set at the location indicated by the reference symbol B.

When the zoom image corresponding to the reference symbol B (zoom rate=1) in this example is used, the original image 100 is used as the small image as it is. Therefore, the small image is displayed in the format that the original image is reduced as it is, but such case may also be contained in the present invention.

Figure 4:
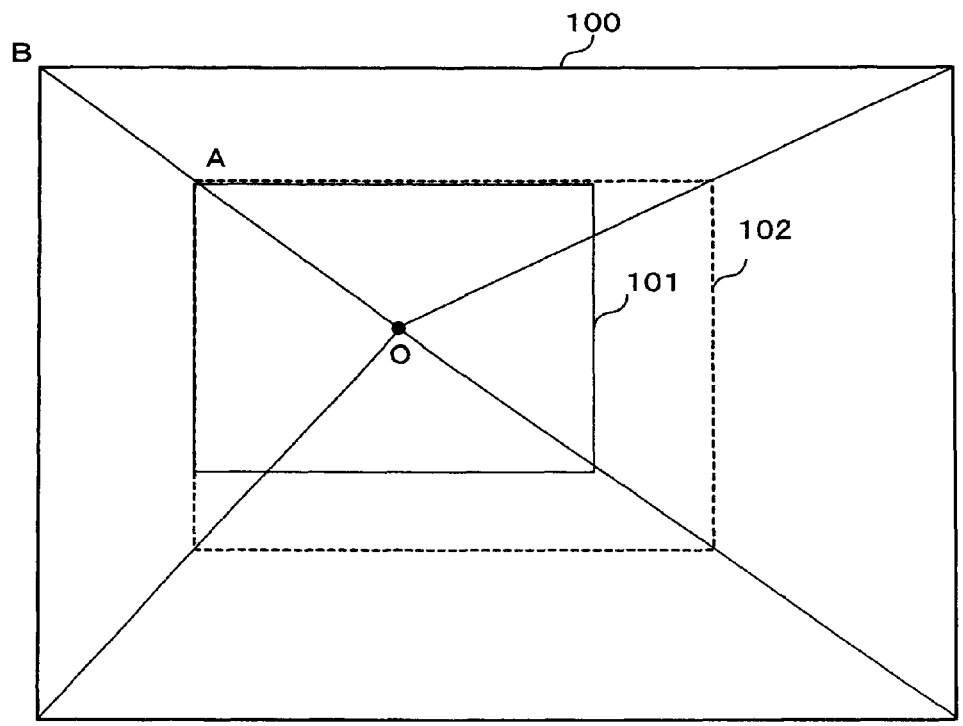
FIG. 4 A view explaining an example of the way a zoom image is produced.

FIG. 4 shows an example of the way of cutting out a zoom image (method of deciding a shape of the zoom image). In this example, a center O of the main area (image) 101 is set to a center of the zoom, and a vertex of a zoom image 102 is moved along respective lines connecting the center to respective vertexes of the original image 100. The zoom image 102 can be defined uniquely by varying the zoom rate. In this case, since the main area 101 must always be contained in the zoom image, the zoom image shown by a dotted line gives the zoom image at the maximum zoom rate (the main area 101 overlaps with the zoom image 102 at their left edges). In this example, respective aspect ratios (length/width ratios) of the original image 100 and the zoom image 102 are identical to each other.

Figure 5:
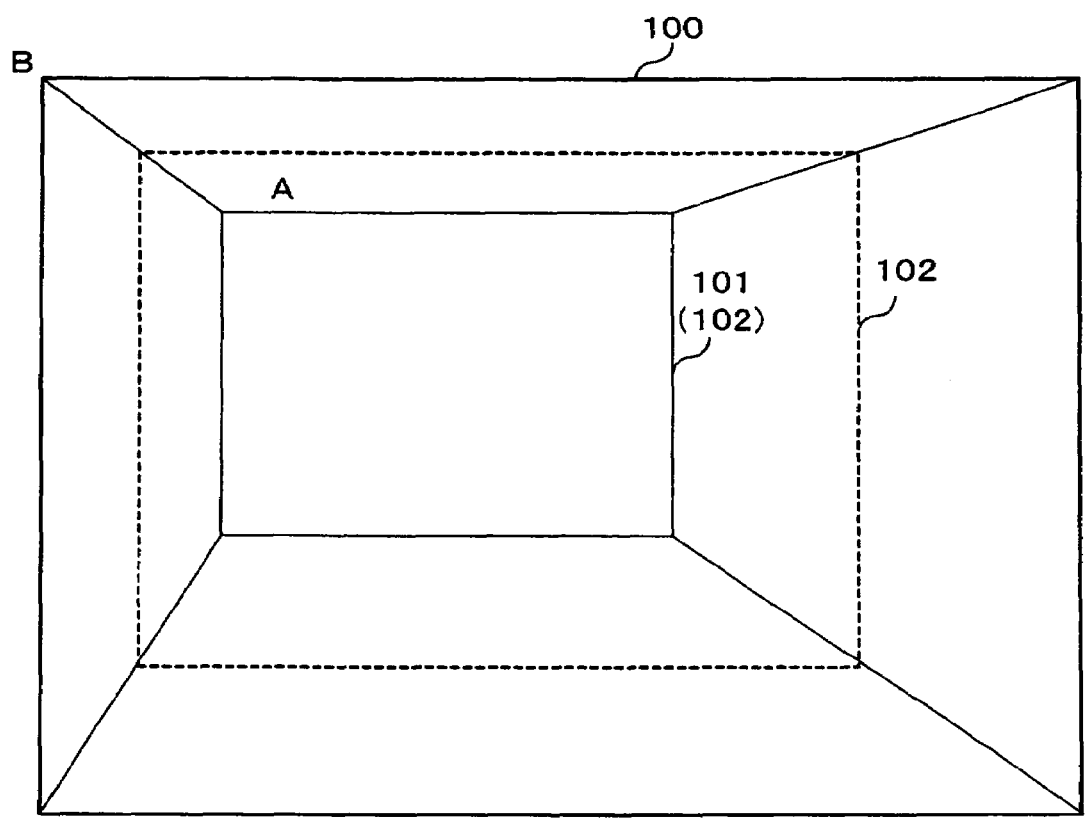
FIG. 5 A view explaining another example of the way a zoom image is produced.

FIG. 5 shows another example of the way of cutting out a zoom image (method of deciding a shape of the zoom image). In this example, the main area 101 is set to the zoom image 102 with the maximum zoom rate, and a vertex of the zoom image 102 is moved along respective lines connecting respective vertexes of the main area 101 to respective vertexes of the original image 100. The zoom image can be defined uniquely by varying the zoom rate. The zoom image 102 indicated by a dotted line is an example.

In the above examples in FIG. 3 to FIG. 5, the image zooming portion 13 acts as a zoom image producing portion that produces the zoom image by zooming in or out the image in the main area in response to the area of the display area output from the layout managing portion 14. Also, the image zooming portion 13 produces the small image displayed actually on the small image list (acts as a small image producing portion) by magnifying or reducing the zoom image zoomed in or out by the above method, and then outputs this image to the image layout designing portion 16.

As described above, the layout managing portion 14 outputs display area information as the information indicating the display areas of respective small areas displayed on the small image list to the image zooming portion 13, and outputs arrangement information of respective small areas displayed on the small image list to the image layout designing portion 16. The display area information corresponds to an area of the small image, and the arrangement information corresponds to a position of the small image.

The display image managing portion 15 stores the small image produced by the image zooming portion 13. The image layout designing portion (small image list producing portion) 16 arranges respective small images acquired from the display image managing portion 15 at predetermined locations of the small image list based on the input arrangement information of respective small images, and produces the small image list.

The above image processing apparatus, when combined with the image displaying portion 17 constructed by the liquid crystal display device, or the like, constitutes the image displaying device. The image displaying portion 17 displays the small image list input from the image layout designing portion 16 on the liquid crystal display device. The pseudo three-dimensional display as shown in FIG. 7 can be employed in displaying the small image list, but the displaying system is not particularly limited. Also, the image display device is installed preferably into various mobile terminals such as the cellular phone, the PDA, and the like, but the product to which the present invention is applied is not particularly limited.

Next, an operation of the image processing apparatus according to the embodiment will be explained hereunder.

Figure 2:
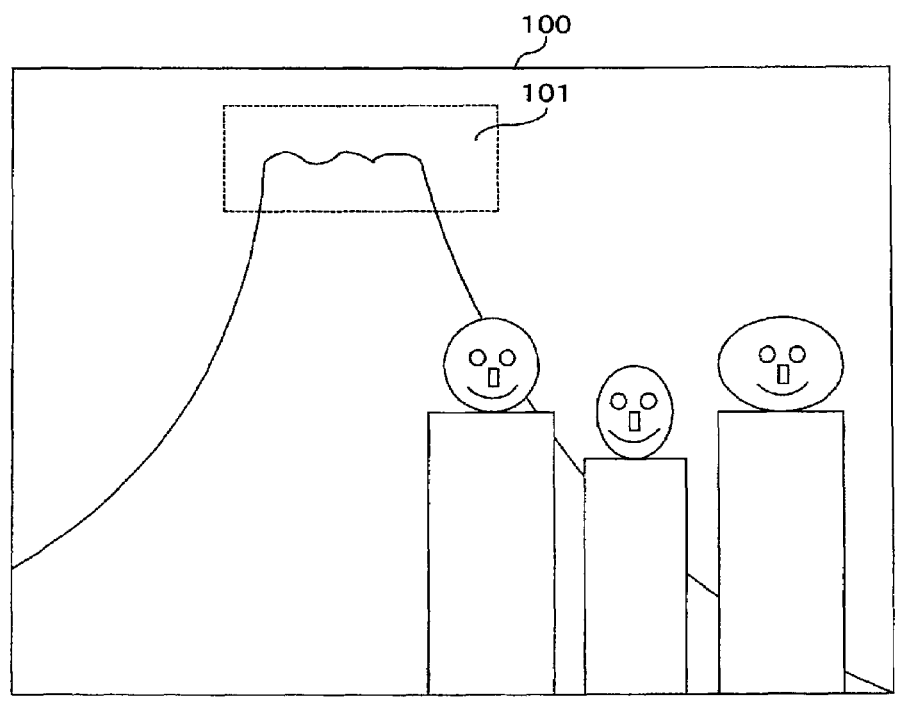
FIG. 2 A view showing an example of an original image and a main area extracted.
Figure 6:
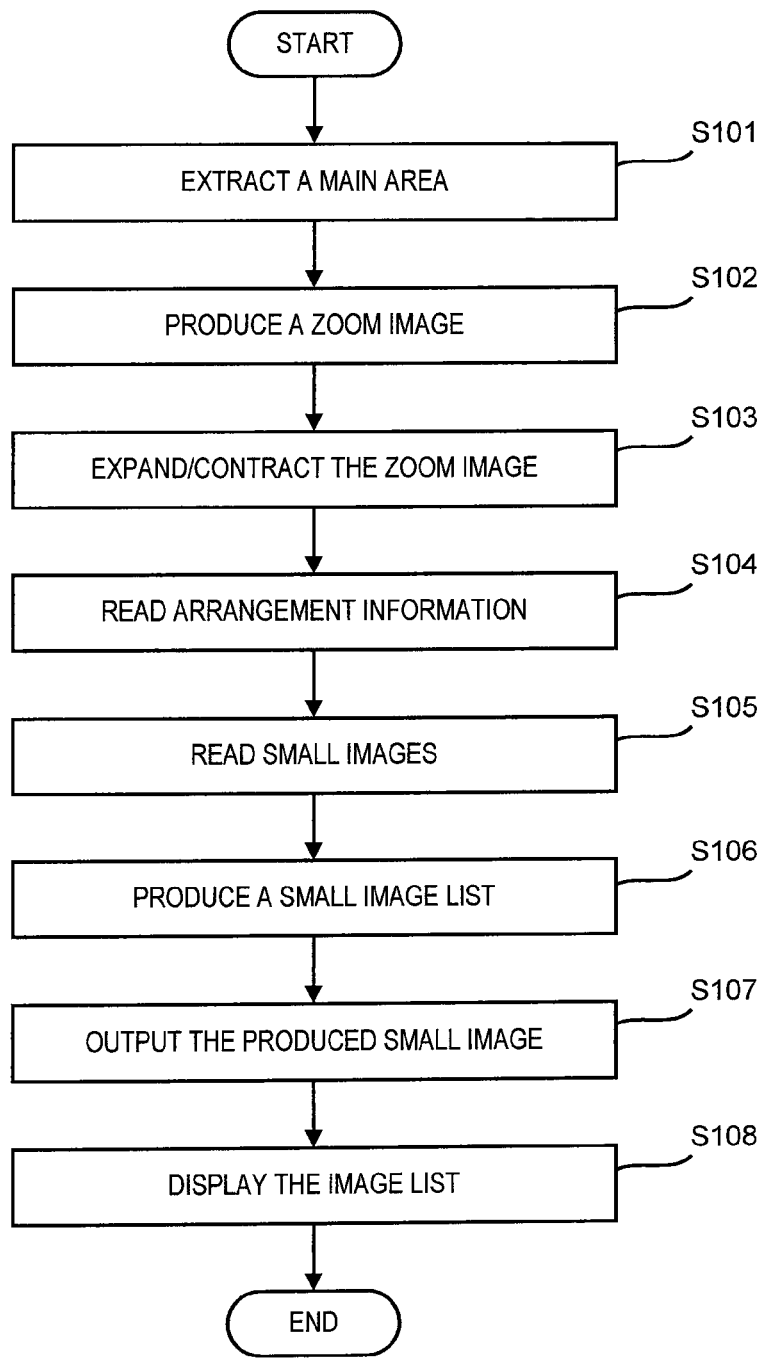
FIG. 6 A flowchart showing an operation of the image processing apparatus according to the embodiment.

FIG. 6 is a flowchart showing an operation of the image processing apparatus according to the embodiment. When the original image 100 is input from the image outputting portion 11, the main area sensing portion 12 extract the image of the main area 101 from the original image 100, as shown in FIG. 2, by using above plural parameters (step S101), and then outputs the image of the main area 101 to the image zooming portion 13.

The image zooming portion 13 produces the zoom image of the image of the main area 101 input from the main area sensing portion 12, based on the information indicating the display area of the small images displayed on the small image list being output from the layout managing portion 14 (step S102). Then, the image zooming portion 13 produces the small image obtained by expanding or contracting the zoom image into a size given in the display area of the small image (step S103), and then outputs this small image to the display image managing portion 15.

The display image managing portion 15 stores the small image being input from the image zooming portion 13. The image layout designing portion 16 reads the arrangement information of respective small images displayed on the small image list from the layout managing portion 14 (step S104), and also reads the small images stored in the display image managing portion 15 (step S105). Then, the image layout designing portion 16 produces a thumbnail list by arranging respective read small images at predetermined locations of the small image list, based on the read arrangement information (step S106).

Then, the image layout designing portion 16 outputs the produced small image list to the image displaying portion 17 (step S107). Then, the image displaying portion 17 displays the input small image list (step S108), and then the process is ended.

In the image processing apparatus of the present embodiment, since the image zooming portion 13 produces the zoom image 102 by zooming in or out the image of the extracted main area 101 in response to the area of the display area output from the layout managing portion 14, it is possible to make the contents of the small image whose image is small easy to understand.

In other words, the zoom rate of the zoom image is set appropriately in answer to the display area of the small image. Therefore, an occupying rate of the main area to represent precisely the contents can be changed in response to respective display areas in respective small images, it is possible to make the contents of the small image easy to understand.

According to the present invention, since the display contents are changed in response to a size of the small image, the contents of the displayed small image can be made easy to understand. Therefore, the present invention is useful to the case where the small images of various sizes should be displayed in plural, like the pseudo three-dimensional display. Of course, a display mode in which the present invention is applied is not limited to the particular system.

This application is based upon Japanese Patent Application (Patent Application No. 2005-192076) filed Jun. 30, 2005; the entire contents of which are incorporated herein by reference.

With the above, various embodiments of the present invention are explained, but the present invention is not limited to the matters recited in the embodiments. The present invention is susceptible to various variations and adaptations made by those skilled in the art based on the description of the specification and the well-known technologies, and these variations and adaptations are contained in a scope within which the protection is sought.

INDUSTRIAL APPLICABILITY

According to the present invention, the image processing apparatus and the image processing method capable of making the contents of small images easy to understand can be provided.

The invention claimed is:

1. An image processing apparatus, comprising
a zoom image producing portion which produces a first zoom image by zooming a part of a first image with a first zoom rate, and a second zoom image by zooming a part of a second image, that is different from the first image, with a second zoom rate; and
a display portion which displays an image list having a first small image and a second small image;
wherein the first small image and the second small image are produced by expanding or contracting the first zoom image and the second zoom image respectively; and
wherein the zoom image producing portion produces the first zoom image from the part of the first image with the first zoom rate, which is greater than the second zoom rate of the second zoom image produced from the part of the second image, when the first small image is displayed on a first display area in the display portion concurrently with the second small image displayed on a second display area in the display portion, the second display area being greater than the first display area.

2. The image processing apparatus according to claim 1, wherein the zoom image producing portion zooms main areas of the first and second images respectively as the parts of the first and second images.

3. The image processing apparatus according to claim 2, wherein the zoom image producing portion zooms in or out the first image such that the main area of the first image is positioned at a center of the first zoom image and the main area is contained in the first zoom image; and
wherein the zoom image producing portion zooms in or out the second image such that the main area of the second image is positioned at a center of the second zoom image and the main area is contained in the second zoom image.

4. The image processing apparatus according to claim 1, wherein the first zoom rate is determined by a ratio of a size of the first zoom image to a size of the first image; and
wherein the second zoom rate is determined by a ratio of a size of the second zoom image to a size of the second image.

5. A mobile terminal apparatus comprising the image displaying device according to claim 1.

* * * * *